(12) United States Patent
Avis et al.

(10) Patent No.: US 9,976,811 B2
(45) Date of Patent: May 22, 2018

(54) SPIRAL HEAT EXCHANGER FOR HYDRODESULFURIZER FEEDSTOCK

(75) Inventors: Thomas Bruce Avis, Manchester, CT (US); Gregory C. Yust, Glastonbury, CT (US)

(73) Assignee: DOOSAN FUEL CELL AMERICA, INC., Atlanta, GA (US)

( * ) Notice: Subject to any disclaimer, the term of this patent is extended or adjusted under 35 U.S.C. 154(b) by 984 days.

(21) Appl. No.: 13/138,225

(22) PCT Filed: Jun. 29, 2009

(86) PCT No.: PCT/US2009/003857
§ 371 (c)(1),
(2), (4) Date: Jul. 21, 2011

(87) PCT Pub. No.: WO2011/002429
PCT Pub. Date: Jan. 6, 2011

(65) Prior Publication Data
US 2011/0272123 A1    Nov. 10, 2011

(51) Int. Cl.
*F28D 7/10*       (2006.01)
*B01J 8/04*       (2006.01)
(Continued)

(52) U.S. Cl.
CPC ............ *F28D 7/106* (2013.01); *B01J 8/0465* (2013.01); *C01B 3/16* (2013.01); *F28D 1/06* (2013.01);
(Continued)

(58) Field of Classification Search
CPC ...... B01J 8/0465; B01J 8/0492; B01J 8/0496;
B01J 2208/00309; B01J 2208/00495;
B01J 2208/0053; C01B 3/386; C01B 3/48; C01B 2203/0244; C01B 2203/0283;
C01B 2203/0288; C01B 2203/044; C01B 2203/0455; C01B 2203/0465; C01B 2203/047; C01B 2203/0485; C01B 2203/066; C01B 2203/0844; C01B 2203/0877; C01B 2203/0883; C01B 2203/1041; C01B 2203/1064; C01B 2203/107; C01B 2203/1082; C01B 2203/1205; C01B 2203/1241; C01B 2203/1247; C01B 2203/1276; C01B 2203/1282; C01B 2203/1294; C01B 2203/142; C01B 2203/143;
(Continued)

(56) References Cited

U.S. PATENT DOCUMENTS 4,819,438 A * 4/1989 Schultz ..................... 60/730
4,847,051 A * 7/1989 Parenti, Jr. ............... 422/202
(Continued)

*Primary Examiner* — Jonathan Miller
(74) *Attorney, Agent, or Firm* — Carlson, Gaskey & Olds, P.C.

(57) ABSTRACT

A cylindrical shift converter (4) is disposed within an annular heat exchanger (28, 24) which has an outer wall (5). A plurality of spiral rods (90) create a plurality of spiral gas passages (26a) between the outer wall and a thin shell (92). The outer diameter of the thin shell is at least about 3/16 inch (about 4 mm) less than the inner diameter of an inner wall (20) of an annular hydrodesulfurizer (10), to facilitate inserting the shift converter and heat exchanger into the hydrodesulfurizer to form a unitized assembly (2). The spiral passages open into the hydrodesulfurizer.

6 Claims, 2 Drawing Sheets

(51) Int. Cl.
    *C01B 3/16*     (2006.01)
    *F28D 1/06*     (2006.01)
    *F28D 7/02*     (2006.01)
    *F28F 1/36*     (2006.01)

(52) U.S. Cl.
    CPC ....... *F28D 7/024* (2013.01); *B01J 2208/0053* (2013.01); *B01J 2208/00141* (2013.01); *B01J 2208/00203* (2013.01); *B01J 2208/00849* (2013.01); *B01J 2208/00884* (2013.01); *B01J 2208/025* (2013.01); *C01B 2203/0205* (2013.01); *C01B 2203/0883* (2013.01); *C01B 2203/0894* (2013.01); *C01B 2203/127* (2013.01); *C01B 2203/1258* (2013.01); *C01B 2203/82* (2013.01); *F28F 1/36* (2013.01); *Y10T 29/49826* (2015.01)

(58) Field of Classification Search
    CPC ........... C01B 2203/169; C01B 2203/82; F28D 7/024; Y02E 60/50
    USPC ...... 422/626, 198, 202; 208/56, 60, 64, 209; 48/127.7, 127.9, 197 R, 198.7; 165/54, 165/156, 163
    See application file for complete search history.

(56) References Cited

U.S. PATENT DOCUMENTS

| | | | | |
|---|---|---|---|---|
| 5,110,559 | A | * | 5/1992 | Kondo et al. ................. 422/109 |
| 5,769,909 | A | * | 6/1998 | Bonk et al. ................... 48/127.9 |
| 6,641,625 | B1 | * | 11/2003 | Clawson et al. ............. 48/127.9 |
| 6,986,797 | B1 | * | 1/2006 | Clawson et al. ............. 48/102 A |
| 7,066,973 | B1 | * | 6/2006 | Bentley et al. ............. 48/197 R |
| 7,507,384 | B2 | * | 3/2009 | Pollica et al. ................ 422/626 |
| 7,563,292 | B2 | * | 7/2009 | Ahmed et al. .................... 48/61 |

\* cited by examiner

SPIRAL HEAT EXCHANGER FOR HYDRODESULFURIZER FEEDSTOCK

TECHNICAL FIELD

A cylindrical shift converter is surrounded, first, by an annular heat exchanger and second, by an annular hydrodesulfurizer, with a plurality of spiral heat exchange passageways disposed between the annular heat exchanger and the hydrodesulfurizer.

BACKGROUND ART

Fuel cell power plants require a source of hydrogen in order to generate electrical power. A conventional method for the production of hydrogen is the reaction of hydrocarbon gases or other fluids with steam in the presence of a catalyst to produce a hydrogen containing gas. Generally, the hydrocarbon that is subjected to the steam reforming process is first desulfurized to avoid poisoning of the reforming catalyst. In a hydrodesulfurization process, the hydrocarbon is treated catalytically in the presence of hydrogen to effect a conversion of the organic sulfur compounds to inorganic compounds which are subsequently removed by absorption.

In U.S. Pat. No. 5,769,909, a fuel gas stream hydrodesulfurizer assembly is thermally coupled with process gas heat exchangers and a shift converter. The high temperature gas stream from the reformer in the power plant is also used to heat steam which is fed to the reformer assembly. The assembly cools the process gas stream from the steam reformer to temperatures which are suitable for the shift conversion reaction.

The hydrodesulfurizer bed includes both the necessary catalyst, and also the necessary hydrogen sulfide absorbent all in one bed. Additionally, the temperature of the natural gas stream entering the hydrodesulfurizing bed must be elevated to a temperature which best promotes the catalytic conversion of sulfur and sulfur compounds to hydrogen sulfide.

The system described in the aforesaid patent was found to not sufficiently heat the raw fuel and hydrogen mixture to a sufficiently high temperature for maximum catalytic conversion of organic sulfur containing compounds in the feedstock to hydrogen sulfide.

SUMMARY

It has been found that the cylindrical space between the outer wall of the annular heat exchanger and the inner wall of the hydrodesulfurizer did not provide sufficient contact with the heated outer wall of the heat exchanger.

Instead of allowing the incoming hydrocarbon fuel and hydrogen to make a simple, single pass in an annular passage adjacent the outer wall of the heat exchanger, a plurality of spiral flow paths have been established by means of a plurality of spiral rods in contact with the outer wall of the heat exchanger and contained within a thin outer shell. During manufacture of the assembly, in order to facilitate the insertion of the shift converter and heat exchanger, including the new spiral flow paths on the outer heat exchanger wall, into the hydrodesulfurizer, the hydrodesulfurizer is given its own annular inner wall which is separate from the thin shell surrounding the spiral rods, and is separated therefrom sufficiently to allow easy assembly of the apparatus, by about ¼ inch (about 6 mm).

Other variations will become more apparent in the light of the following detailed description of exemplary embodiments, as illustrated in the accompanying drawings.

MODE(S) OF IMPLEMENTATION

Figure 1:
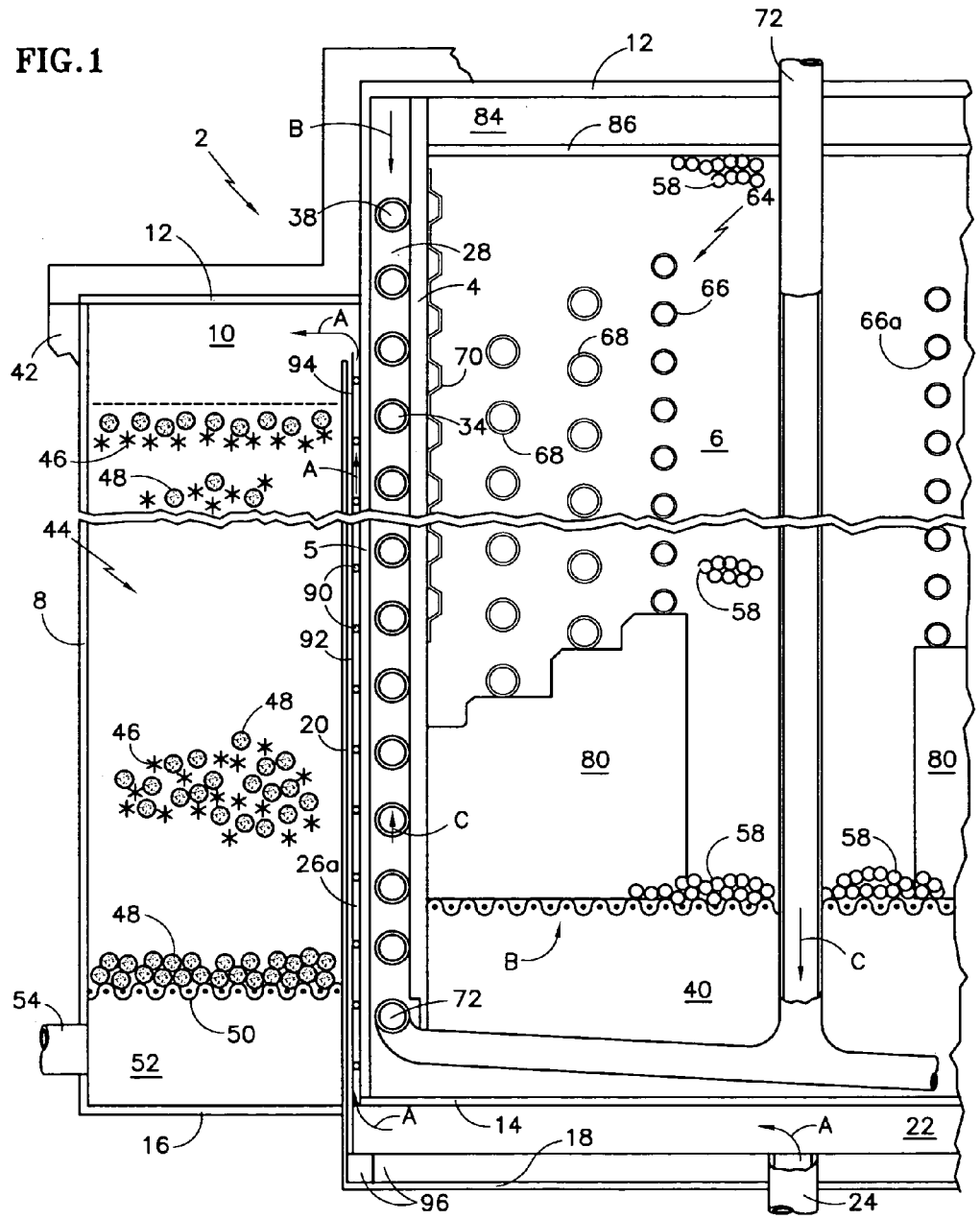
FIG. 1 is a fractional, sectioned front elevation of apparatus including a shift converter surrounded by two heat exchangers and a hydrodesulfurizer, with section lines omitted for clarity.

Referring to FIG. 1, there is shown a cross-sectional view of a hydrodesulfurizer and shift converter assembly 2 which is presented as the assembly of the aforementioned patent, except for the present improvement. The reference numerals (signs) are the same herein as in said patent, which is incorporated herein by reference. The assembly 2 includes an inner cylindrical housing wall 4 in which the shift converter portion 6 of the assembly 2 is contained. The assembly 2 also includes an outer cylindrical housing wall 8, and a medial cylindrical wall 5. The area between the medial wall 5 and the outer wall 8 contains an annular hydrodesulfurizer portion 10 which surrounds the shift converter portion 6. The upper end of the shift converter and the hydrodesulfurizer portions 6 and 10 are closed by a top cover plate 12. The bottom end of the shift converter 6 is closed by a plate 14; and the bottom end of the hydrodesulfurizer 10 is closed by an annular plate 16. An assembly base plate 18 supports an annular wall member 20 which extends upwardly into the hydrodesulfurizer 10. The base plate 18, annular wall 20, and shift converter plate 14 combine to form a lower plenum 22 which receives a mixture of raw fuel and recycled hydrogen from line 24.

Figure 2:
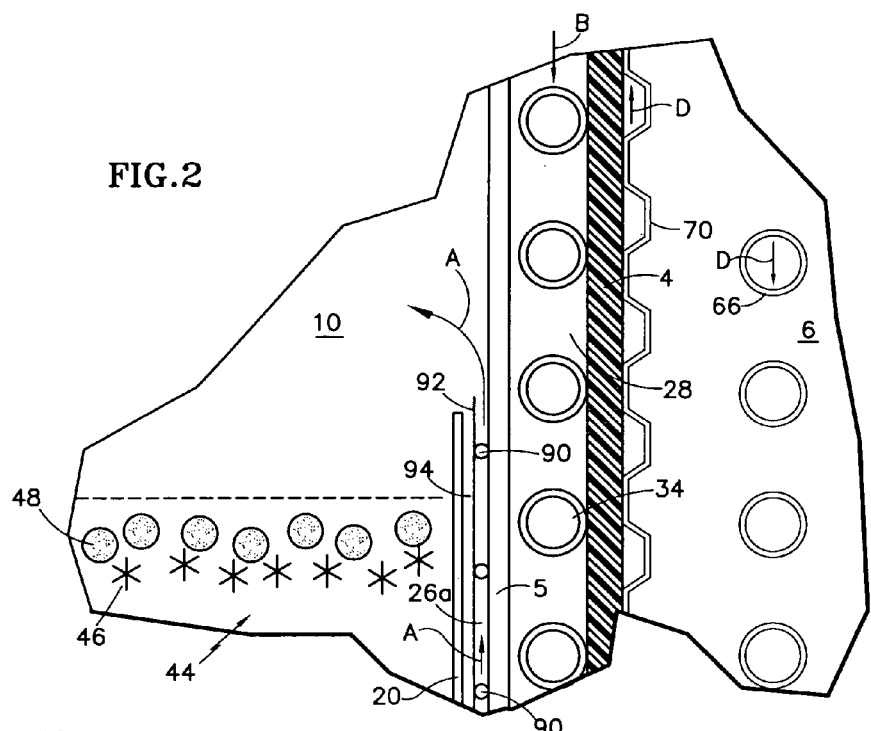
FIG. 2 is an expanded, fractional view of a portion of the apparatus of FIG. 1.
Figure 3:
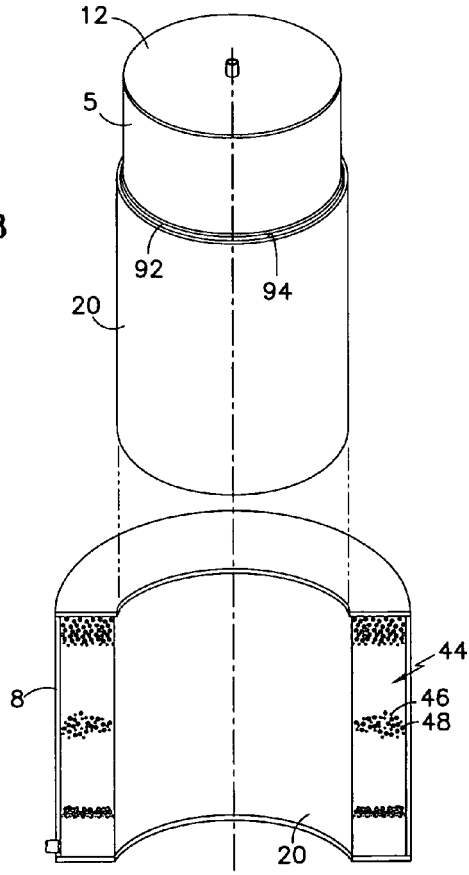
FIG. 3 is a simplified, stylized illustration of the manner in which the shift converter with its surrounding heat exchangers is to be inserted into the annular hydrodesulfurizer.

The raw fuel and hydrogen mixture enters the plenum 22 and flows upwardly through a plurality of spiral passageways 26a formed by a plurality of spiral rods 90 and a thin shell 92 which surrounds the rods. See FIG. 2. The rods 90 are in thermal contact with and surround the medial wall 5 which is the outer wall of the heat exchanger portion of the apparatus. The uppermost edge of the thin shell 92 may be tack welded to the upper end of each of the spiral rods 90. In one embodiment there are eight rods; but there can be as few as one rod or some other number. The number of passes the gas must flow around the wall 5 can be selected by the number of rods and the number of coils per rod. The space 94 between the hydrodesulfurizer inner wall 20 and the thin shell 92 provides clearance of at least about 3/16 inch (about 4 mm), or about ¼ inch (about 6 mm) to enable easy assembly, as shown in FIG. 3. The space 94 is blocked by a seal 96 so no gas will flow therein. The passages 26a lead to the hydrodesulfurizer 10, as indicated by arrows A. The raw fuel gas-hydrogen mixture enters the plenum 22 at a temperature of about 120° F. The space between the inner wall 4 and the medial wall 5 forms an annular passage 28 through which high temperature process gas from the power plant reformer (not shown) flows. The process gas enters the plenum at a temperature of about 800° F. and flows downwardly through the passage 28 as indicated by arrows B. Disposed in the passage 28 is a helical steam superheater tube 34 which has an inlet end 72 and an outlet end 38. The tube 34 carries steam which enters the inlet end 72 at a temperature of about 350° F. and exits the outlet end 38 at a temperature of about 700° F. The steam flow path is denoted by the arrows C. The steam flows from the outlet end 38 to the power plant reformer (not shown).

The passages 26a and 28 share the common wall 5 so that the high temperature process gas in passage 28 can raise the temperature of the fuel-hydrogen mixture in the passages 26a, as well as giving off heat to the steam in the tube 34. The high temperature process gas contains more heat than can be absorbed by both the flowing steam in the helical coil 34 and the fuel-hydrogen mixture in helical passages 26a. This additional heat is recovered through wall 4 to the heat exchanger plate coil 70 which is positioned on the shift converter side of the wall 4. This ensures that the process gas is cooled to the correct shift converter inlet temperature. Heat removal by the plate coil 70 also helps moderate the temperature of the hot process gas so that the fuel-hydrogen mixture and steam are not heated in excess of their desired exit temperatures.

The process gas flows from the passage 28 into a shift converter inlet plenum 40. As it enters the inlet plenum 40, the process gas will have cooled to a temperature of about 375° F. to 400° F.; and the fuel gas-hydrogen mixture will have reached a temperature of about 625° F. by the time it leaves the passages 26a and enters the hydrodesulfurizer chamber 10. The outer wall 8 of the hydrodesulfurizer 10 is insulated by thermal insulation 42 so as to maintain the desired operating temperatures in the chamber 10. The heated fuel gas-hydrogen mixture flows from the passage 26a downwardly through the hydrodesulfurizer bed 44. The bed 44 is composed of a mixture of catalyst pellets 46 and hydrogen sulfide absorbent pellets 48, and is supported on an annular screen 50.

The catalyst composition of the present arrangement is particularly adapted for use in the hydrogenolysis step of the hydrodesulfurization of low sulfur content hydrocarbon fluids, i.e., those hydrocarbon fluids having a sulfur content of less than or equal to about 50 ppm.

The rate at which the organic sulfur containing compounds in a hydrocarbon fluid undergo hydrogenolysis is accelerated by contact with the catalytically active noble metal. The catalyst composition catalyzes the hydrogenolysis of organic sulfur containing compounds to yield hydrogen sulfide.

The noble metal catalyst may be selected from the platinum group of noble metals, consisting of platinum, palladium and rhodium as well as iridium, osmium and ruthenium, or mixtures thereof. A platinum/palladium mixture is preferred. Generally, higher temperatures favor a higher catalyst activity and a more complete hydrogenolysis reaction or conversion to $H_2S$.

The hydrogen sulfide product of the hydrogenolysis reaction must be removed from the hydrocarbon fluid to complete the hydrodesulfurization process. This may be accomplished by passing the effluent stream through a bed of hydrogen sulfide absorbent material. Particles of metal oxides, such as the oxides of iron, copper, nickel or zinc may be used as hydrogen sulfide absorbents. Zinc oxide is the preferred hydrogen sulfide absorbent material. By mixing the catalyst and hydrogen sulfide absorbent together in a single bed, poisoning of the catalyst by hydrogen sulfide is greatly reduced. Lower temperatures generally favor lower equilibrium $H_2S$ levels at the exit end of the hydrodesulfurizer bed.

As previously noted, the fuel gas-hydrogen mixture flows into the bed 44 at a temperature of about 625° F. which is the optimum catalytic reaction temperature, and as it flows downwardly through the bed 44, its temperature will cool to about 525° F. by the time it passes through the screen 50 into the outlet plenum 52. This reduction in temperature from inlet to exit is the result of cooling by the fuel gas-hydrogen mixture flowing through spiral passages 26a and heat loss to the environment through insulation 42. The lower temperature is more favorable to the hydrogen sulfide absorption reaction. The desulfurized gas stream flows from the plenum 52 into line 54 which leads to the power plant reformer.

As noted above, the reformed process gas stream returns to the assembly 2 through the shift converter entry plenum 40 and flows upwardly through a screen 56 into the shift converter 6. The shift converter 6 contains catalyzed pellets 58 operable to cause carbon monoxide in the process gas stream to be converted to carbon dioxide.

The aforesaid shift conversion reaction is exothermic, and therefore produces heat. The temperature of the gas stream is actively controlled by means of a compound heat exchange coil. The heat exchange coil 64 includes an inner portion 66, a middle and outer portions 68 and a shift converter wall portion 70. The coolant enters the bottom of the wall portion 70 through an inlet passage (not shown), then shifts to the inner portion 66. The coolant is then transferred to the middle and outer portions 68. The coolant removes heat not only from the shift converter but also aids in removal of excess heat from the hot process gas before it enters the shift converter. This dual function ensures both the required shift converter inlet temperature and the desired fuel-hydrogen mixture and steam superheat temperatures. This heat exchange relationship between the hot process gas, steam superheater, fuel-hydrogen mixture preheater, and the shift converter cooling stream produces the thermal synergy which allows the design of a compact assembly and ensures optimum operating temperatures for each of its components. The coolant exits the shift converter through a line (not shown).

The coolant is preferably a pressurized water coolant, which enters the wall portion 70 as a single phase water coolant which is pressurized to a pressure in the range of about 100 psi to about 250 psi, and a temperature in the range of about 300° F. to about 350° F. The temperature of the single phase coolant should be about 25° F. below the boiling point of water at that pressure. The coolant stream leaving the outer portion 68 of the shift converter is a boiling phase water-steam mixture which is transferred to a steam accumulator (not shown) in the power plant. The coolant provides the heat sink necessary to cool the process gas in the shift converter by boiling a pressurized coolant water stream so as not to significantly elevate the temperature of the coolant water stream. The coolant circulating through the wall portion 70 of the heat exchange coil 64 will assist in lowering the temperature of the process gas stream B. The heat exchange coils 66 and 68 are supported by legs 80.

The process gas enters the shift converter 6 at a temperature of about 375° F. and leaves the catalytic bed at a temperature of about 400° F. via an outlet line (not shown) which leads to the cell stack assembly in the power plant. The upper end of the shift converter 6 includes a plenum 84 which is bounded by the cover plate 12 and a filter 86 which overlies the catalyst bed 58 and which prevents catalyst dust from becoming entrained in the shift converter effluent stream.

The wall 4 is about ½ inch (about 12.5 mm) of insulating material. The walls 5 and 20, and the thin shell 92, are of metal, such as steel.

The invention claimed is:

1. An apparatus comprising:
   an annular passage configured to have a flow of hot gas therethrough and having a cylindrical outer wall;
   at least one rod having a plurality of coils surrounding and in thermal contact with said cylindrical outer wall;
   a thin cylindrical shell surrounding and in contact with said at least one rod, thereby establishing a plurality of spiral passages in which to flow gas around said outer wall to absorb heat from said flow of hot gas;
   an annular hydrodesulfurizer having an inner cylindrical wall with a diameter at least a few millimeters greater than the diameter of said thin shell, said spiral passages opening into said hydrodesulfurizer;
   said annular passage surrounding a cylindrical shift converter configured to change CO to $CO_2$; and
   said cylindrical shift converter, said annular passage, and said spiral passages forming a unit which is configured for insertion during manufacture into a cavity defined by said inner cylindrical wall.

2. A method comprising:
   preparing an annular hydrodesulfurizer having an inner cylindrical wall of a first diameter that defines a cavity;
   preparing a cylindrical shift converter configured to change CO to $CO_2$, said shift converter surrounded by an annular passage configured to have a flow of hot gas therethrough, said annular passage having a cylindrical outer wall with at least one rod coiled around said outer wall a plurality of times, and a thin cylindrical shell surrounding and in contact with said at least one rod, thereby establishing one or more spiral passages configured to flow gas around said outer wall to absorb heat from said flow of hot gas, said spiral passages opening into said hydrodesulfurizer; and
   inserting said shift converter into said cavity to form a unitized desulfurizer, heat exchanger, and shift converter assembly;
   wherein said thin cylindrical shell has a second diameter that is less than the first diameter and provides a clearance fit between the cylindrical shell and the inner cylindrical wall within said cavity.

3. The method of claim 2, wherein said inserting is performed such that a gap between the inner cylindrical wall and the thin cylindrical shell is approximately 4-6 mm.

4. The method of claim 2, wherein the clearance fit between the cylindrical shift converter and the inner cylindrical wall defines an annular chamber having a seal that prevents gas from the one or more spiral passages from flowing into the annular chamber.

5. The apparatus of claim 1, wherein when the cylindrical shift converter is inserted into the cavity, a gap between the inner cylindrical wall and the thin cylindrical shell is approximately 4-6 mm.

6. The apparatus of claim 1, wherein when the cylindrical shift converter is inserted into the cavity, an annular chamber is formed between the inner cylindrical wall and the thin cylindrical shell, the chamber having a seal that prevents gas from the spiral passages from flowing into the annular chamber.

\* \* \* \* \*